United States Patent [19]

Burdorf et al.

[11] 4,144,549
[45] Mar. 13, 1979

[54] TRANSDUCER POSITIONING DEVICE

[75] Inventors: Donald L. Burdorf, Newport Beach; James Bjordahl, Arcadia; Roger S. Kincel, Whittier; Harold E. Arns, Chino, all of Calif.

[73] Assignee: BASF Aktiengesellschaft, Ludwigshafen, Fed. Rep. of Germany

[21] Appl. No.: 853,397

[22] Filed: Nov. 21, 1977

[51] Int. Cl.$^2$ ............................................. G11B 21/08
[52] U.S. Cl. ........................................................ 360/78
[58] Field of Search ............................................ 360/78

[56] References Cited

U.S. PATENT DOCUMENTS

| 3,632,114 | 1/1972 | Ban | 360/78 |
| 3,983,579 | 9/1976 | Nishinakagawa | 360/78 |

Primary Examiner—Robert S. Tupper
Attorney, Agent, or Firm—Keil & Witherspoon

[57] ABSTRACT

The present invention relates generally to a transducer positioning and adjusting apparatus and, more particularly, to an improved system for accurately and reproducibly positioning a transducer head in vertical relationship to a series of parallel horizontal tracks on a recording medium such as magnetic video tape. The apparatus comprises a frame upon which the elements of the system are mounted and with respect to which they are vertically aligned. A cam having a plurality of horizontally planar steps formed about its upper surface is rotatably mounted upon said frame and a vertically moveable bearing post, which is secured at one end to the transducer head, is held in continuous contact with the stepping surfaces formed on the cam. A ball bearing which contacts the underside of the cam substantially beneath the stepping surface upon which the bearing post is held in contact is utilized to support the cam on the mounting frame and maintain said stepping surface in precise vertical alignment therewith. A horizontally slidable wedge mounted on said frame upon which the cam supporting ball bearing rides may be utilized to vertically adjust said cam bearing post with respect to the mounting frame. A commutator disk secured to said cam in a predetermined relationship with respect to the stepping surfaces formed thereon electrically signals the position of said cam with respect to said bearing post. A logic circuit is also disclosed which controls the operation of a cam drive motor in response to the signals received from said commutator disk.

13 Claims, 6 Drawing Figures

TRANSDUCER POSITIONING DEVICE

BACKGROUND OF THE INVENTION

Many variations of sophisticated transducer positioning devices are known and used in the magnetic recording industry. A recent example of such a device which closely relates to the field of the present invention is described in U.S. Pat. No. 3,839,737. However, it has been found that a number of serious drawbacks regarding precise head-to-tape alignment, cost and complexity have been associated with the use of such devices.

These problems become particularly acute when processing video signals with linear tape transport devices, such as that disclosed in U.S. Pat. No. 3,921,933, in view of the high tape speeds involved. Due to physical and cost limitations on reel size, it is necessary to record a multiplicity of parallel program tracks across the width of the tape with such high-speed devices. The resulting shorter length of tape is passed repeatedly back and forth past the transducer head, information being recorded on or read from a different track with each pass of the tape.

With such a system operating at a tape speed of 120 inches per second, an 1800 foot reel of tape having twenty-eight parallel tracks can be used to record or playback a standard program of approximately ninty minutes duration. However, the requirement that twenty-eight different tracks be placed in parallel relation on a tape of reasonable width for consumer use has resulted in serious problems regarding alignment of the transducer head with the extremely narrow and closely spaced tracks on the tape. For example, recording twenty-eight tracks on a standard width ¼ inch tape requires that the tracks be typically 6 mils in width with 2 mils spacing therebetween.

It has been found that prior methods of transducer positioning of reasonable cost and complexity were not sufficiently accurate or reproducible for use in such high-speed linear video systems intended for consumer use. Furthermore, these problems are compounded by the fact that the transducer must be moved almost instantaneously (i.e. in less than about 80 milliseconds) from one track to the next at the end of the tape as the system reversed in order to avoid visible interruption of the program material.

In addition, it is desirable that optimization of head-to-track alignment be easily and quickly obtainable by the user so as to provide for the interchangeability of tapes recorded on different machines without the necessity and expense of maintaining extremely high tolerance levels between machines.

BRIEF DESCRIPTION OF THE INVENTION

The present invention eliminates the above-described drawbacks found with conventional transducer positioning and adjusting devices by providing an improved apparatus which is precise and reproducable in its operation while being economical to manufacture and simple to use by operators possessing limited technical skills.

In general, a magnetic transducer head is mounted upon a head platform assembly having a bearing post extending from the bottom end thereof which is continuously in contact with stepping surfaces formed on the upper surface of a stepping cam. The number of levels or horizontal steps formed on the stepping cam correspond to the number of tracks to be recorded or played back from the magnetic tape.

The stepping cam is rotated about three supporting ball bearings by an electric drive motor thereby causing the bearing post to be vertically positioned upon the desired step of the cam which in turn brings the transducer head into position relative to the desired track of the magnetic tape. The movement of the stepping motor is controlled by a logic system which utilizes a printed circuit-type commutator control disk which is mounted on the underside of the stepping cam to insure precise positioning and control of the cam with respect to the head platform bearing post.

Fine adjustment of the transducer to obtain peak signal output from the system is achieved by means of a zero adjustment wedge upon which one of the three cam-supporting ball bearings rides which is located immediately below the head platform bearing post. Vertical adjustment of the transducer head with respect to the parallel program tracks recorded on the magnetic tape is simply and precisely accomplished by means of the operator sliding the zero adjustment wedge back and forth which, in turn, causes corresponding vertical movement of that portion of the cam which supports the head platform bearing post.

DESCRIPTION OF THE DRAWINGS

FIG. 1a is a partial perspective view showing the head-to-tape relationship of the apparatus shown in FIG. 1;

DESCRIPTION OF THE PREFERRED EMBODIMENT

Figure 1:
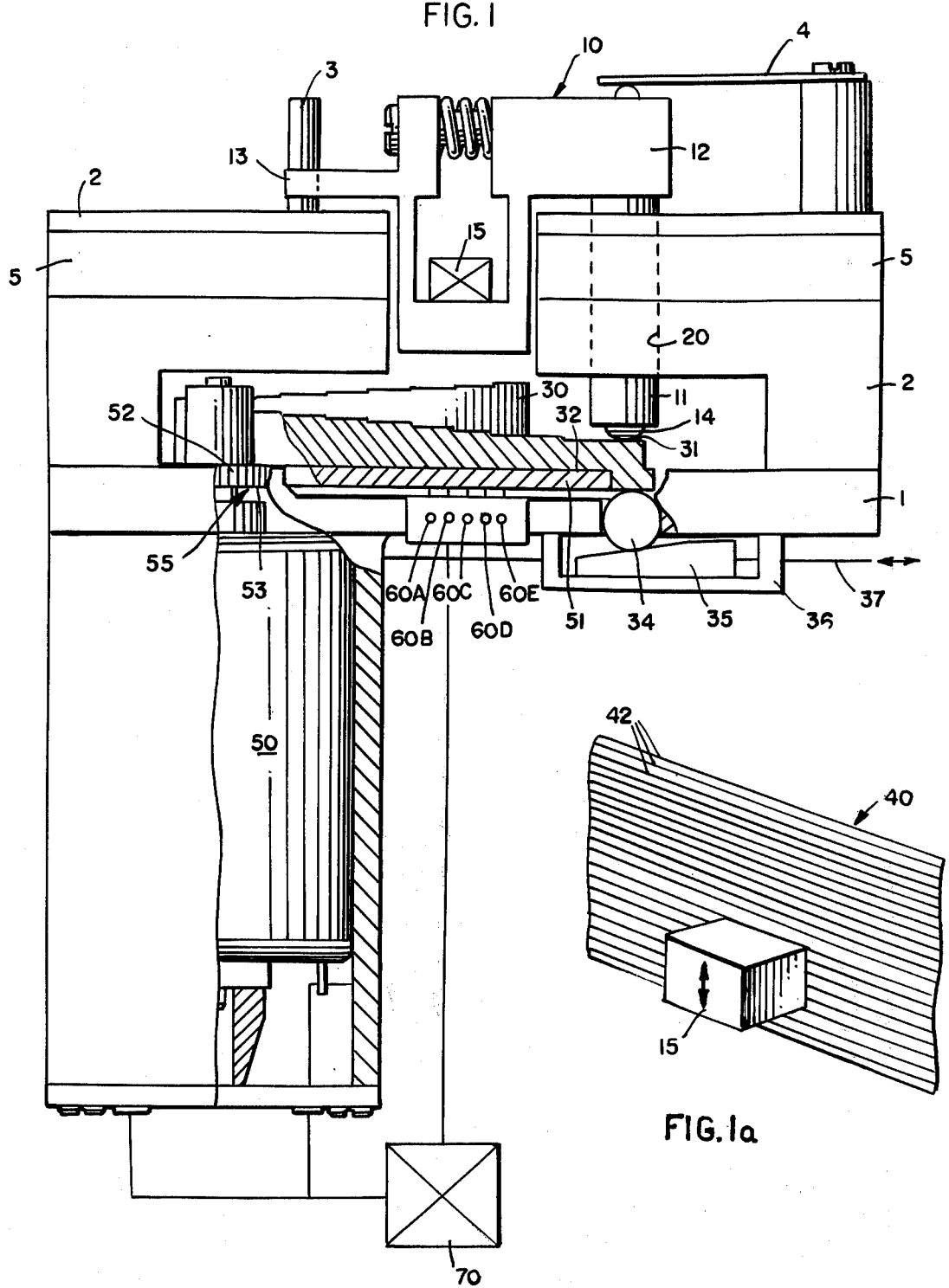
FIG. 1 is a side view in partial section of a transducer positioning and adjusting apparatus constructed in accordance with an embodiment of the present invention.
Figure 2:
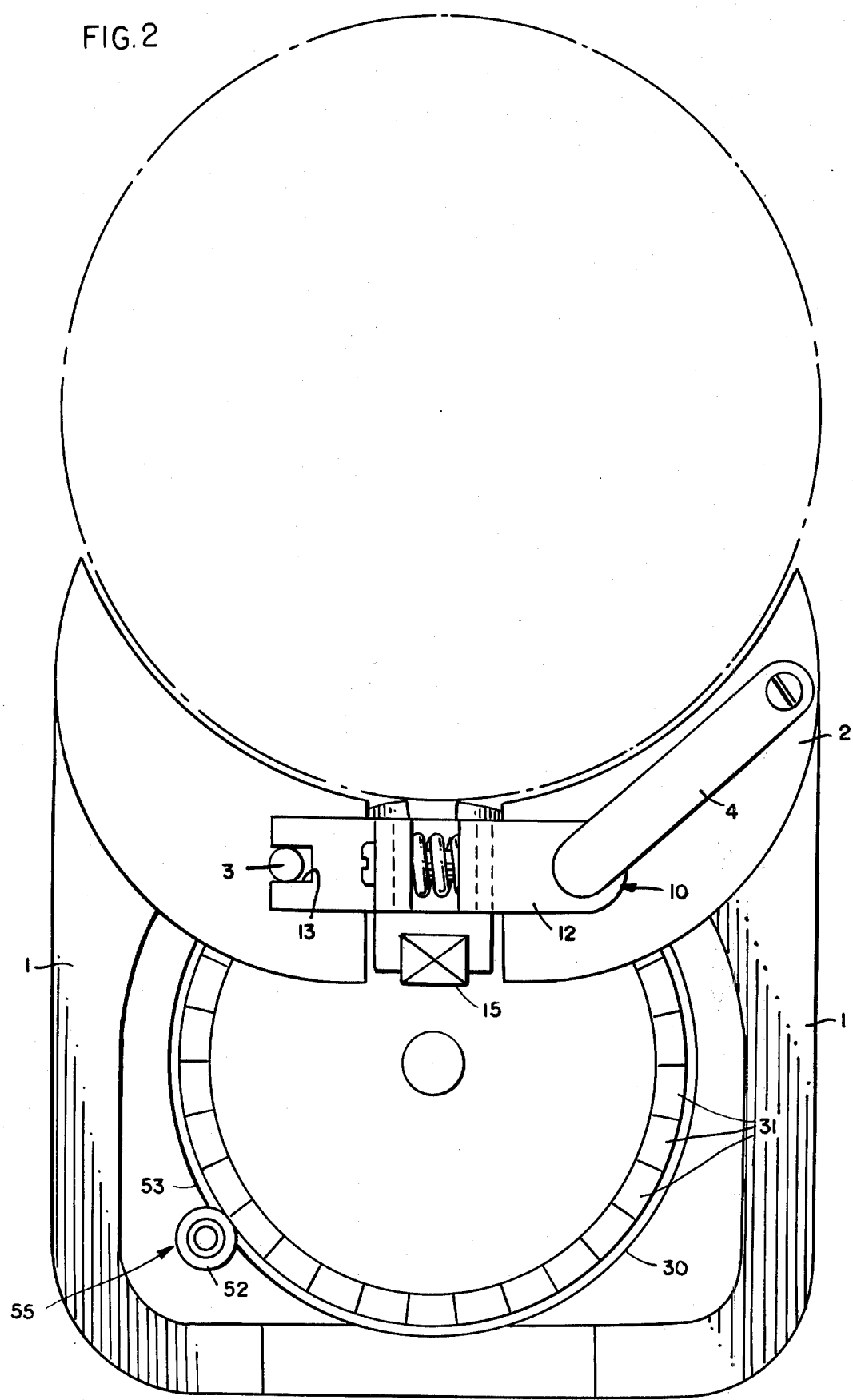
FIG. 2 is a top plan view in partial section of the apparatus shown in FIG. 1.

FIGS. 1 and 2 illustrate an embodiment of a transducer positioning and adjusting device constructed in accordance with the present invention. The device has a main mounting frame 1 upon which the other elements are mounted and with respect to which they are aligned. Transducer platform assembly 10 is slidably mounted on frame 1 by means of bearing post 11 extending from the bottom end of head platform 12 through a bore 20 formed in frame upright 2 which is formed as a solid piece with frame 1. A self-lubricating bearing (not shown) may be placed within bore 20 so as to allow for the friction-free movement of post 11. The other side edge of head platform 12 is aligned with respect to the assembly by means of a fixed pin 3 which is mounted on frame upright 2. A vertical slot 13 formed along the edge of platform 12 assures precise vertical movement of the platform along pin 3. A leaf spring 4 connected at one end to frame upright 2 maintains the free end 14 and post 11 in firm contact with the various stepping surfaces 31 formed on the upper surface of stepping cam 30. In order to allow for the friction-free movement of post 11 over these stepping surfaces, end 14 of the post may be made of a self-lubricating material such as nylon. A transducer device such as a recording head 15 is mounted in such a manner on head platform 12 that it will come into the desired contact with the recording tape 40 (shown in FIG. 1a) which follows a precise path along guides 5 formed in frame upright 2. One manner in which the tape may be guided by guides 5 is disclosed in U.S. Pat. No. 3,979,037. Stepping cam 30 is positioned by motor 50 which is connected to the cam through a gearing arrangement 51. Gearing arrangement 55 comprises a pinion gear 52 connected to the motor shaft which engages a corresponding set of gears 53 formed about the periphery of cam 30.

FIG. 1a illustrates a portion of ¼ inch wide magnetic tape 40 having longitudinal information tracks 41 recorded thereon. The tape used is proper for storage of video signals in the mega-Hertz range. In the preferred embodiment, twenty-eight of such tracks are recorded across the width of the magnetic tape although it would be possible to provide more or less tracks or utilize a tape of differing width. However, in the preferred embodiment each track 42 has a width of 6 mils and its center is spaced 8 mils from the center of its adjacent tracks thereby leaving 2 mils spacing between the tracks.

Corresponding to the twenty-eight tracks 42 recorded on magnetic tape 40, stepping cam 30 has twenty-eight differing levels or steps 31 of equal dimensions. That is, each level or step 31 of cam 30 is formed 8 mils above or below the adjacent steps. Each step is accurately formed flat with a tolerance of ±0.0002 inches. Hence, the height difference between the lowest step (No. 28) and the highest step (No. 1) will be 0.216 inches. The circular path formed by the steps also includes a portion which connects the lowest and highest steps so as to allow the easy sliding transport of end 14 of post 11 from the lowest to highest steps or vice-versa. In the preferred embodiment, each level or step formed on the cam subtends an angle of approximately 12° as measured from the center of the cam.

During the stepping operation, motor 50 rotates cam plate 30 and free end 14 of post 11 is continuously held in contact with the various levels or steps 31 of the cam by means of the downward biasing force applied by leaf spring 14. In the preferred embodiment, a D.C. type motor connected to a logic controlled positioning system is utilized to drive cam 30, althought other types of motors, such as stepping motors, may be used. As is discussed in detail below, the D.C. type motor has the advantage of being cheaper and less noisy in its operation than conventional stepper type motors. In order to reduce the rotational accuracy necessary to be imparted by motor 50 and, hence, their expense, step surfaces 31 must be formed within very close planar tolerances so that inaccuracies in the stepping operation of the motor will not result in inaccuracies in the vertical positioning of the transducer 15.

The lower surface of cam 30 may be provided with means for activating position sensors to control the operation of motor 50. In the present embodiment, a printed circuit commutator disk 51 is fixed within a recess 32 formed within the underside of cam 30 to provide this function. The operation of disk 51 will be discussed in greater detail below in connection with the operation of D.C. motor 50. Also formed around the bottom periphery of cam 30 is flat base portion 33. The dimensioning of this surface with respect to each step is critical since it directly determines the overall tolerance limits obtainable with respect to the vertical positioning of the head with respect to the magnetic tape tracks.

However, since in the preferred embodiment the cam is supported within frame 1 by three ball bearings 34 which typically have a tolerance of ±10 millionths of an inch, it is important that each step be dimensioned with respect to only that portion of the base 33 immediately below it and planar irregularaties of base 33 across the cam can be tolerated due to this three-point support technique.

Vertical zero adjustment of head 15 with respect to the tracks 42 recorded on tape 40 is accomplished in the preferred embodiment by means of a wedge or ramp-shaped member 35 which rests in a housing 36 which allows for its horizontal movement therein in response to the movement of a mechanical control cable 37 which is attached at its end to the wedge. The other end of the control cable is attached to an adjustment device such as a knob 38 which controls its longitudinal movement. The control cable is sufficiently flexible in the preferred embodiment so as to permit adjustment knob 38 to be remotely positioned as desired on the recording device.

Figure 3:
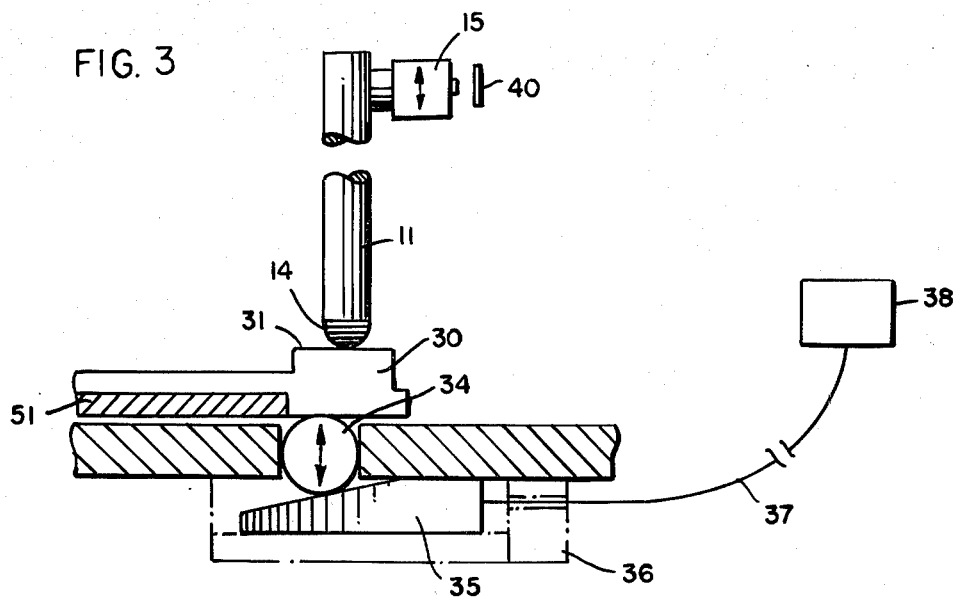
FIG. 3 is an enlarged side sectional view of the zero adjustment portion of the apparatus shown in FIG. 1.

As is best illustrated in FIG. 3, wedge 35 is located immedately below the ball bearing 34 which supports that portion of cam 30 upon which bearing post 11 rests. This ball bearing rests directly upon the ramp surface of the wedge in such a manner that the longitudinal movement of the wedge will result in the vertical displacement of this ball bearing and the edge of the cam which it supports. Since the head carrier bearing post 11 rides upon the upper surface of the cam immediately above this ball bearing, any vertical movement of the cam will result in a corresponding vertical movement of transducer head 15 with respect to the tape 40.

Initial head-to-tape positioning is established by playing a standardized tape in the machine at its final assembly and adjusting the vertical head position for maximum signal output through utilization of the wedge. Once this "standardized" or "zero" position of the wedge and head is established, the control cable 37 is locked into the control knob which is preset in its center or "zero" position. The wedge ramp length and travel is not only sufficient to provide the desired ±0.004 inch user adjustment range of the head position (corresponding to approximately the distance between the center of a track and the edges of the adjacent tracks), but also allows for absorption of tolerance variations present in the overall head stepper assembly when initially setting up the machine as has been discussed above. This adjustability allows for substantial cost savings due to reduced tolerance requirements for the various parts within the head stepper assembly itself.

Figure 4:
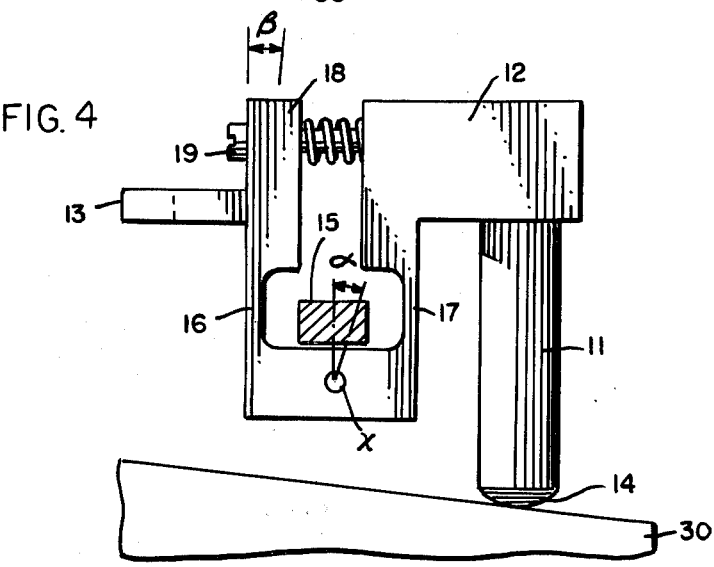
FIG. 4 is an enlarged side view of the head platform portion of the apparatus shown in FIG. 1.

FIG. 4 illustrates a simple and inexpensive azimuth adjustment device utilized in the preferred embodiment of the present invention for precisely aligning the transducer head 15 with respect to recording tape 40 for maximum signal output. Two thin flex portions 16 and 17 are provided on each side of the head platform 12 which may be constructed of such materials as aluminum or suitable plastic which each absorb approximately one-half of the movement of leg portion 18 as screw 19 is adjusted. With this arrangement, the head will rotate only about one-half as much (corresponding to angle $\alpha$) as the leg portion 18 is moved by the adjustment screw (corresponding to angle $\beta$), thereby permitting very precise mechanical adjustment of the head azimuth alignment. In addition, due to the saddle-type design of the platform assembly, the rotational point x of the device is located only slightly below the level of the head 15 thereby substantially reducing the amount of vertical head adjustment necessary after azimuth adjustment.

Figure 5:
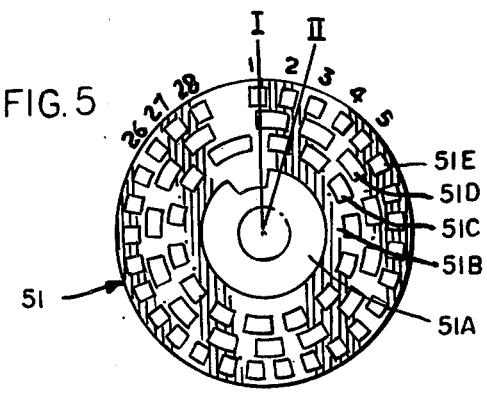
FIG. 5 is a top plan view of commutator control disk portion of the apparatus shown in FIG. 1.

As has been referred to above, the operation of D.C. motor 50 is controlled by a logic system which utilizes signal inputs activated by commutator disk 51 which is secured to the underside of cam 30. As is best shown by FIG. 5, disk 51 comprises a circular printed circuit board having metallic contact surfaces bonded thereto. In the preferred embodiment, the metallic surface is gold plated. There are five circular contact paths formed around the disk which complete an electrical circuit with the individual contact brushes 60 (shown in FIG. 1). The signal information obtained from these five contact circuits determine the angular location of the stepping cam, and hence the transducer head, and feeds this information to a logic circuit which controls the operation of the motor 50.

In the preferred embodiment, the inner contact surface along circular path 51A will complete an electrical circuit with the corresponding inner contact brush 60A and provide a voltage signal to the control logic circuit if the head bearing post 11 is located on steps 1 or 28 of the cam 30. The continuous common signal path 51B, located adjacent to and outside of page 51A, is utilized to supply the input electrical signal to the metallic contact surfaces of the commutator disk. The next outwardly located contact page 51C completes an electrical circuit with corresponding brush 60C if the head is positioned on an odd numbered step of the cam. The remaining two signal paths operate in conjunction to signal whether the cam has been properly rotated to a position in which bearing post 11 is correctly centered on the desired step of the cam. If an electrical circuit is completed by the outermost path 51E, this indicates to the logic circuit that an error in the positioning of the cam has occured and that it has stopped either between steps or in a region outside of the allowable zone for the proper vertical positioning of bearing post 11. The signal provided by path 51D, the contacts of which divide the error zones of path 51E, indicates which side of the allowable stepping zone the error has occured. The drive motor is then either powered forward or is reversed in response to the signal received from path 51D until the correct position is detected from path 51E.

An example will now be given illustrating the operation of the commutator disk. Line I of FIG. 5 shows the alignment of the contact brushes 60 with respect to the commutator disk 31 when the cam is properly positioned with the bearing post 11 located on step 1 of cam 30. No signal is received from path 51E indicating that no positioning error has occurred. A signal is present from path 51C indicating that the cam is located on an odd numbered step and the signal provided by path 51A indicates that it is located on steps 1 or 28. At the end of the tape transport travel, a signal is provided from the logic circuit to the drive motor to rotate the cam counter-clockwise so as to locate the cam of the next adjacent even track. The fact that the cam has rotated to the next even track is indicated by the lack of a signal being produced by path 51C. If the motor drives the cam beyond the acceptable operational zone as is indicated by the alignment of the contact brushes shown along line II, an error signal will be created by path 51E. Since a signal will be present in the contact circuit created by path 51D, this indicates that the motor has rotated the cam too far beyond the permissable zone. In response to this signal, the motor will be reversed by the logic circuit until the lack of an error is indicated from path 51E, thereby positioning the bearing post within the acceptable step zone for the proper vertical alignment of the head with respect to the tape.

Logic circuit 70 (as illustrated in block form in FIG. 1) electrically controls the operation of D.C. motor 50 in response to the various signals received from contact brushes 60 and commutator disk 51 combined with either operator initiated manual forward or backward step command signals or end of tape initiated automatic forward step command signals of various well-known arrangements such as that disclosed in U.S. Pat. No. 3,958,272. The logic circuit may consist of conventional AND, OR, NAND and NOR gates and inverters which control the forward and backward motion of the motor which, in turn, drives the stepper cam 30 forward or backward to the next adjacent step.

By way of illustration, the operation of a particular embodiment of the logic circuit as interrelated with these various signals will now be described, although it is to be understood that various other logic command combinations accomplishing the same objectives would be obvious to one skilled in the art based upon the disclosure of the invention herein contained. The shorthand notations of the command signal used herein are as follows:

FSTP = Forward step signal (manual or end of tape initiated)
BSTP = Backward step signal (manual initiated)
SKOD = Seek odd step signal (internally initiated in logic circuit counting circuit)
ERR = Error signal present in commutator disk path 51E ($\overline{ERR}$ indicates no error signal present)
DIR = Direction signal present in commutator disk path 51D ($\overline{DIR}$ indicates no direction signal present)
ODD = Odd numbered step signal present in commutator disk path 51C ($\overline{ODD}$ indicates no direction signal present)
· = And logic sub-step event derived from AND electronic gate of logic circuit
+ = Or logic sub-step event derived from OR electronic gate of logic circuit
⊕ = Exclusive or logic sub-step event (i.e. one signal present, the other signal not present, but not both present or not present) derived from Exclusive OR electronic gate of logic circuit Hence, the D.C. motor will be driven a forward (FWD) step by the application of a positive drive signal thereto under the following logic conditions:

$$FWD = ERR \cdot (SKOD \oplus \overline{DIR}) + \overline{ERR} \cdot (SKOD \oplus ODD) \cdot FSTP$$

Conversely, the D.C. motor will be driven backward (BWD) step by the application of a negative drive signal thereto under the following logic conditions:

$$BWD = ERR \cdot \overline{FWD} + (SKOD \oplus ODD) \cdot \overline{ERR} \cdot BSTP$$

where $\overline{FWD}$ indicates no forward step signal present from the above forward step logic formula.

Thus, in the example given above of the events that occur when the D.C. motor drives the cam beyond the acceptable operational zone as is indicated by the alignment of the contact brushes shown along line II of FIG. 5, the following logic commands will take place:

No FWD drive signal will occur since although an ERR signal will be present, both SKOD and $\overline{\text{DIR}}$ signals will be absent;

However, a BWD drive signal will occur since both an ERR signal and a $\overline{\text{FWD}}$ signal will be present. The D.C. motor will thusly be driven backward until the ERR signal becomes absent. At this point no FWD or BWD signal will be present until the next FSTP or BSTP signal is initiated.

While several particular embodiments of the present invention have been shown and described herein in detail, it should be understood that various obvious changes and modifications thereto may be made, and it is therefore intended in the following claims to include all such modifications and changes as may fall within the spirit and scope of this invention.

What is claimed is:

1. In an apparatus for precisely positioning and adjusting a transducer head in vertical relationship to a series of parallel horizontal tracks on a recording medium, said apparatus having a vertically moveable bearing post which is secured at one end to the transducer head and is held at its other end in continuous contact with the upper surface of a cam having a plurality of horizontally planar steps formed thereon, said cam being rotatably driven by a motor, the improvement comprising:
   a position signaling disk secured to said cam in a predetermined relationship with respect to the stepping surfaces formed on the upper surface of said cam;
   a means for supplying an electrical signal to said disk;
   a plurality of signal detectors which determine whether an electrical signal is present at said disk for a given position of said cam;
   a first signaling path formed on said disk for providing an electrical signal to said detectors when an error has occurred in the positioning of said cam by said cam motor in that said cam is positioned in a region outside of the allowable zone for the proper vertical positioning of the bearing post upon a desired cam stepping surface;
   a second signaling path formed on said disk for providing an electrical signal to said detectors indicating the direction on which side of said allowable stepping zone which said error has occurred; and
   a logic circuit which controls the forward and backward drive of said cam motor in response to signals provided thereto by said detectors whereby any error occurring in the positioning of said bearing post upon a desired cam stepping surface will be corrected by said logic circuit driving said cam motor in the proper compensating direction until no error signal is produced.

2. The apparatus of claim 1 further comprising a third signaling path formed on said disk for providing an electrical signal to said detectors indicating whether said bearing post is positioned on an even or odd numbered stepping surface formed on said cam.

3. The apparatus of claim 2 wherein said position signaling disk comprises a commutator disk.

4. The apparatus of claim 3 wherein said commutator disk is a printed circuit board and said signaling paths comprise electrical contact paths formed on said printed circuit board.

5. The apparatus of claim 4 wherein said first signaling path comprises a series of electrical contacts located about said printed circuit board in direct relationship to those regions of the cam stepping surface outside of the allowable zone for the proper vertical positioning of the bearing post.

6. The apparatus of claim 5 wherein said second signaling path comprises a series of electrical contacts located about said printed circuit board which divide the electrical contact areas of said first signaling path in a manner so as to indicated on which side of the allowable stepping zone the error has occurred.

7. The apparatus of claim 1 wherein said logic circuit comprises a means for causing said motor to rotate said cam in a forward direction when said signal detector corresponding to said first signaling path indicates that said cam is positioned in a region outside of the allowable zone for the proper vertical positioning of the bearing post and said signal detector corresponding to said second signaling path indicates that said cam has not been driven far enough into the allowable stepping zone wherein said bearing post will properly come to rest on the desired cam stepping surface.

8. The apparatus of claim 7 wherein said logic circuit further comprises a means for causing said motor to rotate said cam in a reverse direction when said signal detector corresponding to said first signaling path indicates that said cam is positioned in a region outside of the allowable zone for the proper vertical positioning of the bearing post and said signal detector corresponding to said second signaling path indicates that said cam has been driven beyond the allowable stepping zone wherein said bearing post will properly come to rest on the desired cam stepping surface.

9. The apparatus of claim 8 wherein said logic circuit further comprises a means for causing said motor to rotate said cam in a forward direction in response to a forward step command signal.

10. The apparatus of claim 9 wherein said forward step command signal is initiated automatically in response to a signal derived from said recording medium.

11. The apparatus of claim 10 wherein said logic circuit further comprises a means for causing said motor to rotate said cam in a backward direction in response to a backward step command signal.

12. The apparatus of claim 11 wherein said backward step command signal is manually initiated.

13. The apparatus of claim 12 wherein said logic circuit further comprises a means for causing said cam to be rotated to a position wherein said bearing post is located on an odd numbered stepping surface.

* * * * *

UNITED STATES PATENT AND TRADEMARK OFFICE
CERTIFICATE OF CORRECTION

PATENT NO. : 4,144,549
DATED : March 13, 1979
INVENTOR(S) : DONALD L. BURDORF ET AL.

It is certified that error appears in the above-identified patent and that said Letters Patent are hereby corrected as shown below:

Col. 3, line 43, "14" should read -- "4"
Col. 5, line 58, "of" should read -- "on"

Signed and Sealed this

Sixth Day of November 1979.

[SEAL]

Attest:

RUTH C. MASON
Attesting Officer

LUTRELLE F. PARKER
Acting Commissioner of Patents and Trademarks